(12) United States Patent
Lane et al.

(10) Patent No.: US 7,837,008 B1
(45) Date of Patent: Nov. 23, 2010

(54) PASSIVE ACOUSTIC BARRIER

(75) Inventors: Steven A. Lane, Albuquerque, NM (US);
Scott J. Kennedy, Morrisville, NC (US);
Jerry Alcone, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1059 days.

(21) Appl. No.: 11/239,439

(22) Filed: Sep. 27, 2005

(51) Int. Cl.
*F16K 17/00* (2006.01)
(52) U.S. Cl. ..................... 181/284; 181/210; 181/286; 181/207; 181/209; 181/198; 428/297.7; 244/1 N
(58) Field of Classification Search ................ 181/284, 181/286, 207, 209, 210, 198; 428/297.7; 244/1 N
See application file for complete search history.

(56) References Cited

U.S. PATENT DOCUMENTS

| | | | |
|---|---|---|---|
| 3,515,910 A * | 6/1970 | Whitehouse et al. | 310/326 |
| 3,614,992 A * | 10/1971 | Whitehouse et al. | 181/284 |
| 3,615,961 A * | 10/1971 | Meyer et al. | 156/62.2 |
| 4,232,084 A * | 11/1980 | Tate | 428/321.5 |
| 4,384,634 A | 5/1983 | Shuttleworth et al. | |
| 4,560,028 A | 12/1985 | Perret | |
| 4,585,685 A * | 4/1986 | Forry et al. | 428/143 |
| 4,667,768 A * | 5/1987 | Wirt | 181/286 |
| 4,842,097 A | 6/1989 | Woodward et al. | |
| 5,016,409 A * | 5/1991 | Sato | 52/167.2 |
| 5,024,290 A | 6/1991 | Birker | |
| 5,087,021 A * | 2/1992 | Tanahashi et al. | 267/140.12 |
| 5,304,415 A * | 4/1994 | Kurihara et al. | 428/328 |
| 5,400,296 A * | 3/1995 | Cushman et al. | 367/1 |
| 5,504,282 A | 4/1996 | Pizzirusso et al. | |
| 5,526,324 A * | 6/1996 | Cushman | 367/1 |

(Continued)

FOREIGN PATENT DOCUMENTS

JP 03197743 A * 8/1991

OTHER PUBLICATIONS

P. M. Morse & K. U. Ingard, *Theoretical Acoustics*, pp. 489-490, Princeton University Press, Princeton, New Jersey (1986).

(Continued)

*Primary Examiner*—Jeffrey Donels
*Assistant Examiner*—Forrest M Phillips
(74) *Attorney, Agent, or Firm*—James M. Skorich

(57) ABSTRACT

A capsule contains fluid and a solid inertial mass that is free to move within the capsule. The capsule is embedded in a foam panel. A plurality of such foam panels are attached to the internal wall of a launch vehicle fairing. This device augments acoustic energy dissipation with damping the resonant frequency of the fairing to reduce the amount of energy that is transmitted into the acoustic volume contained within the wall. Incorporating a plurality of capsules respectively tuned to many frequencies provides broadband structural attenuation. This abstract is provided to comply with the rules requiring an abstract, and is intended to allow a searcher or other reader to quickly ascertain the subject matter of the technical disclosure. It is submitted with the understanding that it will not be used to interpret or limit the scope or meaning of the claims.

19 Claims, 13 Drawing Sheets

U.S. PATENT DOCUMENTS

| | | | |
|---|---|---|---|
| 5,658,656 A * | 8/1997 | Whitney et al. | 428/304.4 |
| 5,670,758 A * | 9/1997 | Borchers et al. | 181/286 |
| 5,706,249 A | 1/1998 | Cushman | |
| 5,745,434 A | 4/1998 | Cushman | |
| 5,754,491 A | 5/1998 | Cushman | |
| 5,824,973 A | 10/1998 | Haines et al. | |
| 5,904,318 A | 5/1999 | Towfiq | |
| 5,907,932 A | 6/1999 | LeConte et al. | |
| 5,910,082 A * | 6/1999 | Bender et al. | 52/144 |
| 6,090,478 A * | 7/2000 | Nishizaki et al. | 428/297.4 |
| 6,109,388 A | 8/2000 | Tsukamoto et al. | |
| 6,195,442 B1 | 2/2001 | Griffin et al. | |
| 6,231,710 B1 | 5/2001 | Herup et al. | |
| 6,237,302 B1 * | 5/2001 | Fricke | 52/404.1 |
| 6,736,423 B2 * | 5/2004 | Simonian et al. | 280/731 |
| 7,205,043 B1 * | 4/2007 | Spero et al. | 428/292.1 |
| 7,249,653 B2 * | 7/2007 | Sheng et al. | 181/290 |
| 7,263,028 B2 * | 8/2007 | Thomas et al. | 367/1 |
| 7,327,039 B2 * | 2/2008 | Charles et al. | 257/778 |
| 7,419,714 B1 * | 9/2008 | Magerl et al. | 428/131 |
| 2002/0081423 A1 * | 6/2002 | Heffelfinger | 428/297.4 |
| 2004/0115413 A1 * | 6/2004 | Lofgren | 428/297.4 |
| 2005/0155449 A1 * | 7/2005 | Birchmeier et al. | 74/552 |
| 2005/0194201 A1 * | 9/2005 | Tenghamn et al. | 181/112 |
| 2006/0286362 A1 * | 12/2006 | Kubota | 428/297.4 |
| 2008/0124513 A1 * | 5/2008 | Eleazer et al. | 428/113 |

OTHER PUBLICATIONS

L. L. Beranek, *Noise and Vibration Control*, pp. 370-376, 2d edition, Institute of Noise Control Engineering, Cambridge, Massachusetts (1988).

L. D. Pope, "On the Transmission of Sound through Finite Closed Shells: Statistical Energy Analysis, Modal Coupling, and Nonresonant Transmission," *J. of the Acoustical Society of America*, vol. 50, No. 3 (Part 2), pp. 1004-1018 (1971).

P. Gardonio, N. S. Ferguson & F. J. Fahy, "A Modal Expansion Analysis of Noise Transmission Through Circular Cylindrical Shell Structures with Blocking Masses," *J. of Sound and Vibration*, vol. 244, No. 2, pp. 259-297 (2001).

W. O. Hughes, A. M. McNelis & H. Himelblau, "Investigation of Acoustic Fields for the Cassina Spacecraft: Reverberant Versus Launch Environments," AIAA-99-1985, pp. 1193-1203, American Institute of Aeronautics and Astronautics (1999).

C. R. Fuller & J. P. Mallard, "Control of Aircraft Interior Noise Using Globally Detuned Vibration Absorbers," *J. of Sound and Vibration*, vol. 203, No. 5, pp. 745-761, Academic Press Limited (1997).

S. Griffin, S. A. Lane, C. Hansen & B. Cazzolato, "Active Structural Acoustic Control of a Rocket Fairing Using Proof-Mass Actuators," *Journal of Spacecraft and Rockets*, vol. 38, No. 2, pp. 219-225, American Institute of Aeronautics and Astronautics, Inc. (Mar.-Apr. 2001).

S. Griffin, J. Gussy, S. Lane, B. Henderson & D. Sciulli, "Virtual Skyhook Vibration Isolation System," *Journal of Vibration and Acoustics*, Vo. 124, No. 1, pp. 63-67, ASME (Jan. 2002).

* cited by examiner

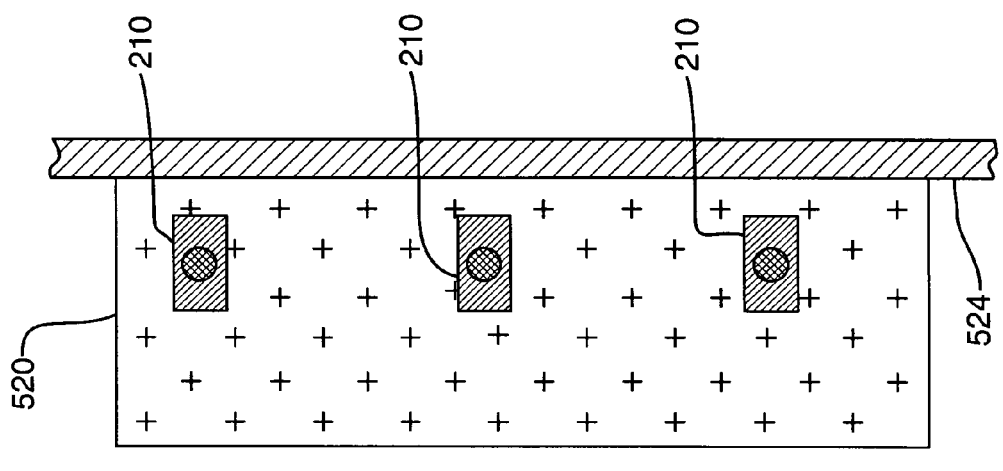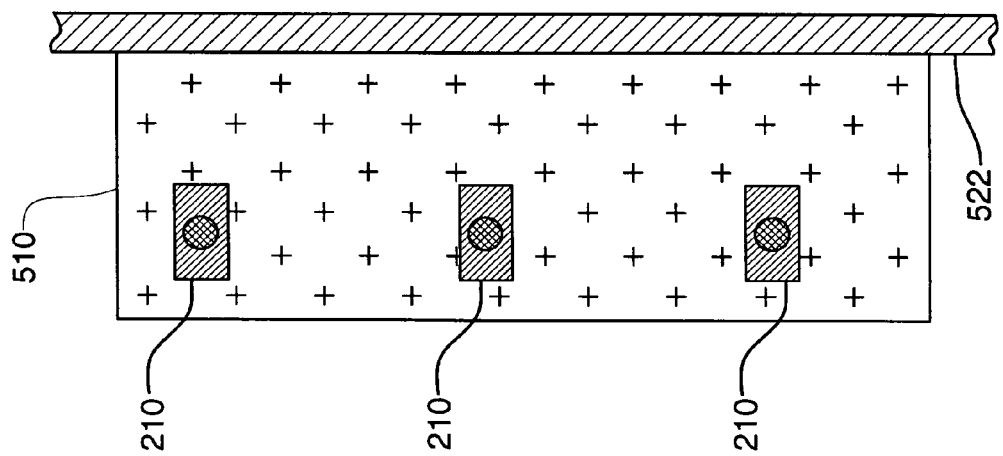
Fig. 5

PASSIVE ACOUSTIC BARRIER

The invention described herein may be manufactured and used by or for the Government of the United States for all governmental purposes without the payment of any royalty.

BACKGROUND OF THE INVENTION

This invention relates to mitigating vibro-acoustic energy and, more particularly, mitigating such energy in a launch vehicle payload fairing to reduce the resulting load on the payload and thereby decrease the probability of damage to the payload.

Vibration and acoustic energy generated by rocket engines are transmitted through the launch vehicle fairing and create severe vibro-acoustic loads that can damage payloads. The magnitude of vibration transmitted into the payload volume largely depends on the external noise levels, the mass, stiffness, and damping characteristics of the fairing, and the acoustic damping within the fairing volume. Composite fairings currently being developed are much lighter and stiffer than their metal-alloy predecessors. However, composite fairings typically have little inherent damping. The lack of damping results in structural resonances, which are very efficient paths for noise transmission, and are thus deleterious to a fairing payload.

Acoustic blankets are often attached to the inside of fairings to absorb acoustic energy, thereby reducing the overall response in the fairing. Acoustic blankets are typically fabricated using low-density fiber material or foam. Current acoustic blankets for launch vehicles are usually less than six inches thick because there are strict constraints on their mass and volume. As a result, such blankets do not provide much sound absorption below 250 Hz. Although acoustic blankets can damp acoustic resonances in the fairing, they do little to alter the structural dynamics of the fairing.

The physics of sound transmission through walls and panels, and the effect of sound attenuating blankets, have been well documented in the relevant technical literature. Fairing noise transmission can be considered as the coupling of two dynamic systems, the fairing structure and the acoustic volume enclosed by the structure, which is excited by an external distributed broadband acoustic field. The responses of both dynamic systems exhibit resonant behavior, which is determined by physical properties such as air density, structural stiffness, structural mass, structural damping, acoustic damping, the speed of sound, and geometry. A mathematical model of fluid-structure coupling and a further discussion of the physics is reviewed in L. D. Pope, "On the Transmission of Sound through Finite Closed Shells: Statistical Energy Analysis, Modal Coupling, and Nonresonant Transmission", *J. of the Acoustical Society of America*, Vol. 50, No. 3 (Part 2), pp. 1004-1018 (1971); and in P. Gardonio, N. S. Ferguson and F. J. Fahy, "A Modal Expansion Analysis of Noise Transmission Through Circular Cylindrical Shell Structures with Blocking Masses" *J. of Sound and Vibration*, Vol. 244, Number 2, pp. 259-297 (Academic Press, 2001).

It has been observed that the vibration loads transmitted to the payload by the interior acoustic response are comparable in level to the vibrations transmitted by mechanical truss mounts. There has been much work to reduce the mechanical path transmission using isolation systems, but little progress has been made to reduce the acoustic path transmission. For the Cassini spacecraft launched using a Titan-IV booster, special acoustic blankets were designed, tested, and implemented to meet acoustic load requirements. This work is documented in W. O. Hughes, A. M. McNelis, and H. Himelblau, "Investigation of Acoustic Fields for the Cassini Spacecraft: Reverberant Versus Launch Environments", AIAA-99-1985, (American Institute of Aeronautics and Astronautics, 1999). As noted by Hughes et al., there has been little development in aerospace acoustic blankets since the 1970's. They also found that acoustic blankets are typically effective only above 400 Hz.

Acoustic blankets provide absorption (or damping) of pressure waves, which means that acoustic energy is converted to heat by interacting with the blankets. The amount of interaction between the blanket and the sound field is frequency dependent. In order to damp low frequency sound, thicker blankets are required. The amount of damping added to an acoustic resonance is determined by impedance matching between the material and fluid waves, material thickness, surface area coverage, and the ability of the material to dissipate energy, with the latter being ultimately limited by mass and volume constraints.

Fairing noise control for launch vehicles is similar to general aircraft noise control, which has been thoroughly researched. In one solution for aircraft, vibration absorbers are attached to the fuselage skin to reduce the structural vibration and sound radiation by the aircraft's skin. C. R. Fuller and J. P. Maillard, "Control of Aircraft Interior Noise Using Globally Detuned Vibration Absorbers", *J. of Sound and Vibration*, Vol. 203, No. 5, pp. 745-761 (Academic Press Limited, 1997). As noted therein, interior noise response is reduced in two ways: first, the devices can couple to structural resonances and add structural damping, thereby reducing the amplitude of the resonant response (classical tuned mass damper approach); and secondly, by interacting with and breaking up the response of structural modes that radiate acoustic energy, often referred to as "modal reconfiguration". A similar approach was discussed in the previously referenced paper by Gardonio et al., supra, wherein it is shown that discrete masses added to the fairing shell could reduce coupling between structural modes and the acoustic modes. It has also been shown that passive dynamic absorbers can couple to the fairing structure and significantly reduce interior noise transmission. S. Griffin, S. Lane, C. Hansen, and B. Cazzolato, "Active Structural-Acoustic Control of a Rocket Fairing Using Proof-Mass Actuators," *Journal of Spacecraft and Rockets*, Vol. 38, No. 2, pp. 219-225 (American Institute of Aeronautics and Astronautics, Inc., March-April 2001).

There are a number of devices that enhance noise reduction by increasing sound absorption through a panel. For example, U.S. Pat. No. 4,384,634, titled "Sound Absorbing Structures," uses a perforated face sheet attached to a honeycomb panel to provide acoustic damping, and a viscous elastic layer between the panel and vibrating structure, e.g., a jet engine, to damp structural motion. This treatment, however, is generally too heavy for a fairing and would not provide as much broadband acoustic absorption as a conventional foam blanket. Furthermore, viscous elastic treatments are not effective in coupling with low frequency structural resonances and in providing damping.

U.S. Pat. No. 4,560,028, titled "Sound Absorbing Wall Lining," discloses a fluid-filled honeycomb panel where wave motion in the fluid provides acoustic damping. This invention is intended for waves in fluid mediums, such as underwater. Such a fluid-filled structure would weigh too much for use in launch vehicle fairings.

U.S. Pat. No. 4,667,768, titled "Sound Absorbing Panel," shows a variation of the honeycomb panel. This patent teaches the reactive versus resistive resonator approach, and incorporates panel drains to release liquid build-up, and spheres to fill the honeycomb cell volumes in order to create varying acoustic resonances. This apparatus was designed for jet engine exhaust nacelles, and is not directed to increasing the transmission loss through a structure into an enclosed acoustic volume.

U.S. Pat. No. 4,842,097, titled "Sound Absorbing Structure," also teaches reactive and resistive acoustic resonators bored into sound insulation material. Again, only acoustic damping, without providing any structural damping, is addressed. While the patent claims "substantial sound absorption at frequencies of less than about 1000 Hz", it is a fact that as the target frequencies become lower, the volume of the resonators' cavities must become larger to reduce the effective air spring. Enlarging the volume of the resonators' cavities in accordance with the teachings of this patent would require geometries impractical for fairing applications intended to attenuate acoustic frequencies below 200 Hz.

U.S. Pat. No. 5,024,290, titled "Sound Absorbing Panel for Interior Walls," uses grooves, funnels and holes in an attempt to augment the acoustic damping provided by the panel. The holes create a reactive and resistive acoustic resonator effect. What is not discussed in these reactive and resistive resonator patents is that as the resonator damping (the resistive part) increases, the coupling of the device to the acoustic volume decreases. Also, such resonators are essentially wasted volume at high frequency because they provide no acoustic absorption. Thus, it is often preferable in practice to maximize the amount of acoustic foam in order to optimize high frequency attenuation instead of implementing resonators.

In U.S. Pat. No. 5,824,973, titled "Method of Making Sound Absorbing Laminates and Laminates having Maximized Sound Absorbing Characteristics," provides an informative discussion on the role of acoustic impedance and impedance mismatching in designing optimal blanket treatments. In addition to discussing the physics and dynamics of multiplayer porous acoustic absorption laminates, it provides plots of normal incidence sound absorption for a variety of configurations. In each case, it is observed that blanket performance is nearly non-existent at frequencies below 200 Hz. Thus, no benefit would be observed in a structural-acoustic system where resonances occur below 200 Hz. As is the case for nearly all acoustic blanket approaches, no consideration has been given to the structural input path.

U.S. Pat. No. 5,910,082, titled "Sound Absorbing Building Panel," teaches a panel for use as a wall or ceiling tile. The innovation lies in the use of "sound absorbing" granules, which are adhered to one another to form matrix. Such an approach may be beneficial for high frequencies, but it will not damp low frequency acoustic resonances. At low frequency, the sound waves will see the matrix layer as a single, lumped panel and propagate across the panel without attenuation. This treatment is thus ineffective for low frequency absorption or for mitigating structural-acoustic transmission in lightly damped structures.

U.S. Pat. No. 6,090,478, titled "Sound Absorbing/Shielding and Electric Wave Absorbing Plastic Sheet Containing Encapsulated Magnetic Fluid, and Sound Absorbing/Shielding and Electric Wave Absorbing Plastic Panel," discloses a lightweight sound absorbing material with insulating effects. The invention comprises a "sound absorbing and insulating" plastic panel, with glass "balloons" or magnetic fluid-filled capsules. The fluid-filled capsules provide electromagnetic shielding at high frequencies (800 MHz). The use of microcapsules of fluid dispersed randomly throughout a plastic composite, however, cannot significantly mitigate low frequency structural-acoustic transmission outside of mass loading benefits, which could be better achieved with a softer and higher density material. Moreover, even of one were to overlook the aforementioned shortcomings, the density of such a panel would result in a weight that would far exceed allowable weight limits for launch vehicles. In launch vehicles, the acoustic treatment must be lightweight and compact.

U.S. Pat. No. 6,109,388, titled "Sound Absorbing Mechanisms Using a Porous Material," presents another panel that incorporates imbedded acoustic resonators. As with other efforts for sound absorbing panels, this invention focuses only on absorbing or damping the acoustic space without addressing structural transmission.

There are some devices that seek noise reduction by preventing or reducing the transmission of noise, as opposed to enhancing acoustic absorption. For example, U.S. Pat. No. 5,504,282, titled "Sound Transmission and Absorption Control Media," teaches a sound transmission barrier for boats and motor vehicles using multiple "high-mass" layers. In launch vehicles, it is desirable to couple to and damp low frequency structural modes with minimal added mass.

U.S. Pat. No. 5,907,932, titled "Wall Structure Having Enhanced Sound Transmission Loss," discloses two walls separated by an isolating barrier. To extend the transmission loss to low frequencies, however, the walls must be de-coupled, which requires that the combined structure be relatively thick. This is often impractical, as in the case of launch vehicle fairings.

There are also many apparatus that address both sound and vibration transmission. Typically, the panel absorption is enhanced if the panel is fabricated from a non-homogeneous material, and vibration damping is provided through molecular friction resulting from wave propagation through a viscous elastic layer. U.S. Pat. No. 5,400,296, titled "Acoustic Attenuation and Vibration Damping Materials," issued to Cushman and Thomas, discloses a material or barrier intended to provide both acoustic absorption and vibration damping. Particles such as glass spheres, steel pellets, brass pellets, or chunks of lead or cork, are arbitrarily or randomly dispersed in a matrix of some type of urethane, silicon rubber, elastomer, polymer, gypsum, or petroleum extract. There is no tailoring or designing of the vibration damping mechanism to the resonance frequencies of a structural application, e.g., an aircraft fuselage or launch vehicle fairing. The only vibration attenuation mechanism taught by the foregoing device is the damping of waves as they propagate through the material, which results from internal molecular friction. This type of approach yields weak coupling and provides little dissipation of the structural resonances of the host structure.

The key innovation of the '296 patent is the use of very small (≈100-micron diameter) particles in the elastomeric matrix to interact with wave energy propagating in the material in order to convert the wave energy from one type of wave, e.g., bending, to another type of wave e.g., torsional. It is asserted that mechanical energy is converted to heat through the wave transformations that are expected to occur, thereby reducing the transmission of energy through the material. Propagating energy is diffused. The efficiency of this mechanism is a function of the wavelength of the energy being propagated, the wave speed of the matrix material, the directionality of the incident acoustic energy, and the material density. At low frequency, sound waves would pass through the material with little to no effect unless the thickness of the material was on the order of ¼-wavelength of the incident sound wave.

U.S. Pat. No. 5,526,324, titled "Acoustic Absorption and Damping Material with Piezoelectric Energy Dissipation," issued to Cushman, discloses piezoelectric particles embedded within a matrix material. It is asserted that the particles act as electrical short circuits and are able to convert acoustic and vibration energy into heat through electrical discharge. This approach would be significantly heavier that traditional blankets since it requires electrically conductive or active materials and piezoelectric particles. Its impedance matching to the acoustic space and broadband attenuation would be inferior to that provided by foam. The particles are said to be randomly distributed. This neglects transmission loss at low frequency. U.S. Pat. No. 5,706,249, titled "Panel Spacer with Acoustic and Vibration Damping," also issued to Cushman, teaches an acoustic and vibration dampening spacer to hold apart and transmit loads between multi-panel walls. Mechanical waves propagating in the panel, whether resulting from acoustic loads or structural vibration, are dissipated by an elastomeric material. The disclosed device is simply an elastomer spacer placed between panels, and is not related to a sound absorbing or sound barrier treatment suitable for fairings.

U.S. Pat. No. 5,745,434, titled "Acoustic Absorption and Damping Material with Integral Viscous Damping," also issued to Cushman, is basically the same concept originally presented in U.S. Pat. No. 5,400,296, but employs a material composed of discarded tire rubber and has channels and passage ways through a matrix to allow for more effective acoustic coupling. Obviously, such a product would be very dense, have poor acoustic coupling ability, and would reduce structural transmission primarily by increasing the mass and thus the impedance load. It would also be subject to the same bandwidth limitations that were noted in the '296 patent. U.S. Pat. No. 5,754,491, titled "Multi-technology Acoustic Energy Barrier and Absorber," yet another patent issued to Cushman, also uses the concept disclosed in the '296 patent, with the added innovation of using multiple layers, with each layer being separated by a viscous elastic layer intended to act as a constrained-layer damper.

U.S. Pat. No. 6,237,302, titled "Low Sound Speed Damping Materials and Methods of Use," teaches a vibration and acoustic treatment that utilizes granular fill. In this invention, a granular material, e.g., lead shot, sand, or rice, is used to damp structural vibrations. The granular material is placed in "intimate contact" with the structural member. The invention asserts that structurally radiated noise can be reduced by the granular damping treatment. However, the patent describes only means to damp structural vibration; it provides no means to absorb acoustic energy. The process taught therein would significantly increase the mass of the structure. Furthermore, the foregoing approach is not designed to target those frequencies that most contribute to noise transmission.

As previously noted, the fairing noise problem is similar to the aircraft cabin noise problem. U.S. Pat. No. 5,904,318, titled "Passive Reduction of Aircraft Fuselage Noise," presents the concept of using a reinforced skin structure to mitigate interior noise. A combination of air barriers, insulating layers, and dampening rods is incorporated into double or multiple layer panels of a fuselage, which is impractical for a fairing. The effect is to decouple the various panel layers and increase the damping of structural resonances. This patent is noteworthy because it provides a good explanation of the structural-acoustic coupling between the external loads, fuselage skin, and the enclosed acoustic space. It is pointed out that "vibrating skin panels can often act as an efficient loud speaker, radiating noise into the interior panels and into the cabin of the aircraft." The patent discusses the use of acoustic blankets and their limitations. It also discusses the use of viscous elastic treatments that are applied directly to the vibrating fuselage in an attempt to add damping to structural resonances. At low frequency, however, there is little strain energy transferred to the viscous elastic material, and thus little damping is added to the low frequency dynamic response.

Several references directly address the vibro-acoustic response in launch vehicle fairings. U.S. Pat. No. 5,670,758, titled "Acoustic Protection on Payload Fairings of Expendable Launch Vehicles," and U.S. Pat. No. 6,231,710, titled "Method of Making Composite Chambercore Sandwich-type Structure with Inherent Acoustic Attenuation," both teach the use of Helmholtz resonators imbedded in the fairing wall to couple to and attenuate low frequency acoustic resonances in the fairing volume. However, no test data is presented in either patent that demonstrates that this can actually be achieved. In the '758 patent, horn-shaped or cup-shaped resonators are inserted into tile panels of acoustic foam and adhered to the fairing wall. In the '710 patent, double panel walls of the fairing are used as the resonator volumes, with orifices cut into the fairing structure to permit coupling to the acoustic field. Neither invention addresses the structural transmission path, nor is either designed to reduce the amplitude of structural resonances.

U.S. Pat. No. 6,195,442, titled "Passive Vibroacoustic Attenuator for Structural Acoustic Control," teaches the use of a combined structural and acoustic approach. However, this device is designed specifically for low frequency acoustic modes and is intended as an add-on to existing foam treatments. The acoustic mitigation is provided by a tuned diaphragm, membrane structure, or even acoustic resonator, and is not intended to provide the broadband acoustic dissipation of an acoustic blanket.

There is need in the art for a lightweight acoustic barrier between a structure and an enclosed acoustic volume that can optimally interact and dissipate structural resonances of the enclosing structure that contribute to noise transmission into the enclosed acoustic volume, while simultaneously affording maximum dissipation of the broadband interior acoustic response. The present invention addresses this need in the art.

SUMMARY OF THE INVENTION

The present invention is a passive acoustic barrier for launch vehicle fairings and other acoustic enclosures contained within flexible wall structures. The acoustic barrier interacts with and dissipates structural resonances of the enclosing structure that contribute to noise transmission into the acoustic volume, while simultaneously dissipating the broadband interior acoustic response.

The present invention includes at least one foam panel attached to a wall associated with a vehicle. At least one capsule containing a liquid and an inertial mass is embedded within the foam panel. Each capsule contains at least one spherical mass with a diameter that is less than the minimum inner diameter of the capsule, so that the mass is free to move within the capsule.

Other aspects and advantages of the present invention will become apparent from the following detailed description, taken in conjunction with the accompanying drawings, and illustrating by way of example the principles of the invention.

BRIEF DESCRIPTION OF THE DRAWINGS

FIG. 5 is a cross sectional view of two foam panels with multiple embedded capsules respectively located at different depths, in order to target two different structural resonance frequencies.

DETAILED DESCRIPTION

Figure 1:
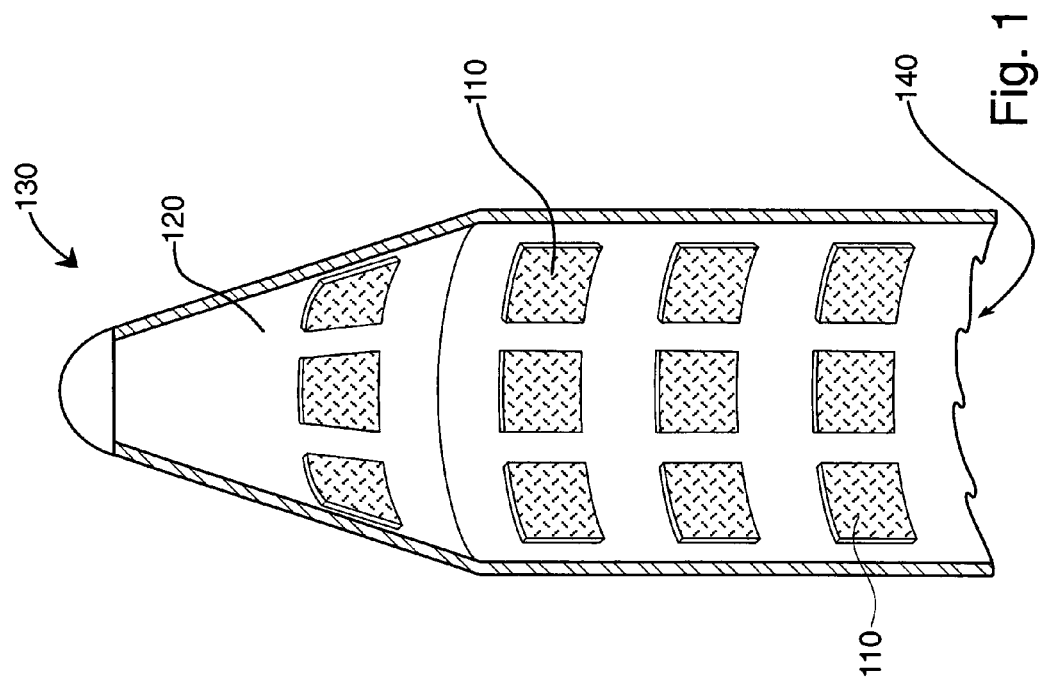
FIG. 1 illustrates multiple foam panels of the present invention attached to the interior wall of a fairing, and shown through cutouts in the fairing.

Turning to the drawings, FIG. 1 illustrates a plurality of acoustic panels 110 of the present invention attached to interior surface of fairing 120 of launch vehicle 130. Panels 110 are shown through random cutouts in fairing 120. Each panel 110 is shaped to avoid interfering with instruments, apparatus, and the payload contained within fairing 120. Panels 110 are comprised of foam adapted to provide broadband dissipation of acoustic energy within volume 140 enclosed within fairing walls 120. The amount of acoustic dissipation is determined by the material properties of the foam, the thickness of the foam, and the total surface area covered.

Figure 2:
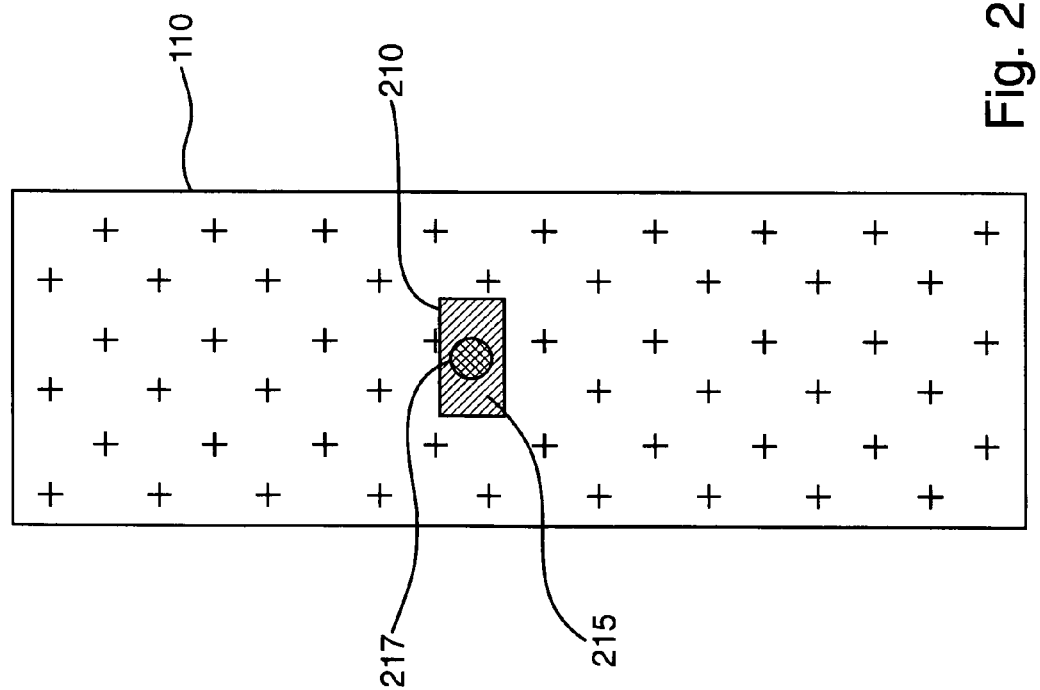
FIG. 2 is a cross-sectional view of a single foam panel with an embedded capsule containing liquid and an inertial mass.

A cross sectional view of panel 110 is illustrated in FIG. 2. Fluid-filled capsule 210 is embedded in panel 110. Capsule 210 contains fluid 215 and inertial mass 217. Capsules 210 are adhered to panel 110 to keep them in place, but an adhesive may not be necessary, depending on the constraining force applied by the foam material. Capsules 210 can be made of metal or polymer; their composition has little relevance to the physics of the invention. Fluid 215 can be a viscous or non-viscous liquid depending on the application and the required damping levels. Inertial mass 217, such as a ball bearing, is sealed inside each capsule 210. The diameter of mass 217 is less than the inner diameter of capsule 210 and permits mass 217 to move relative to capsule 210.

Figure 3:
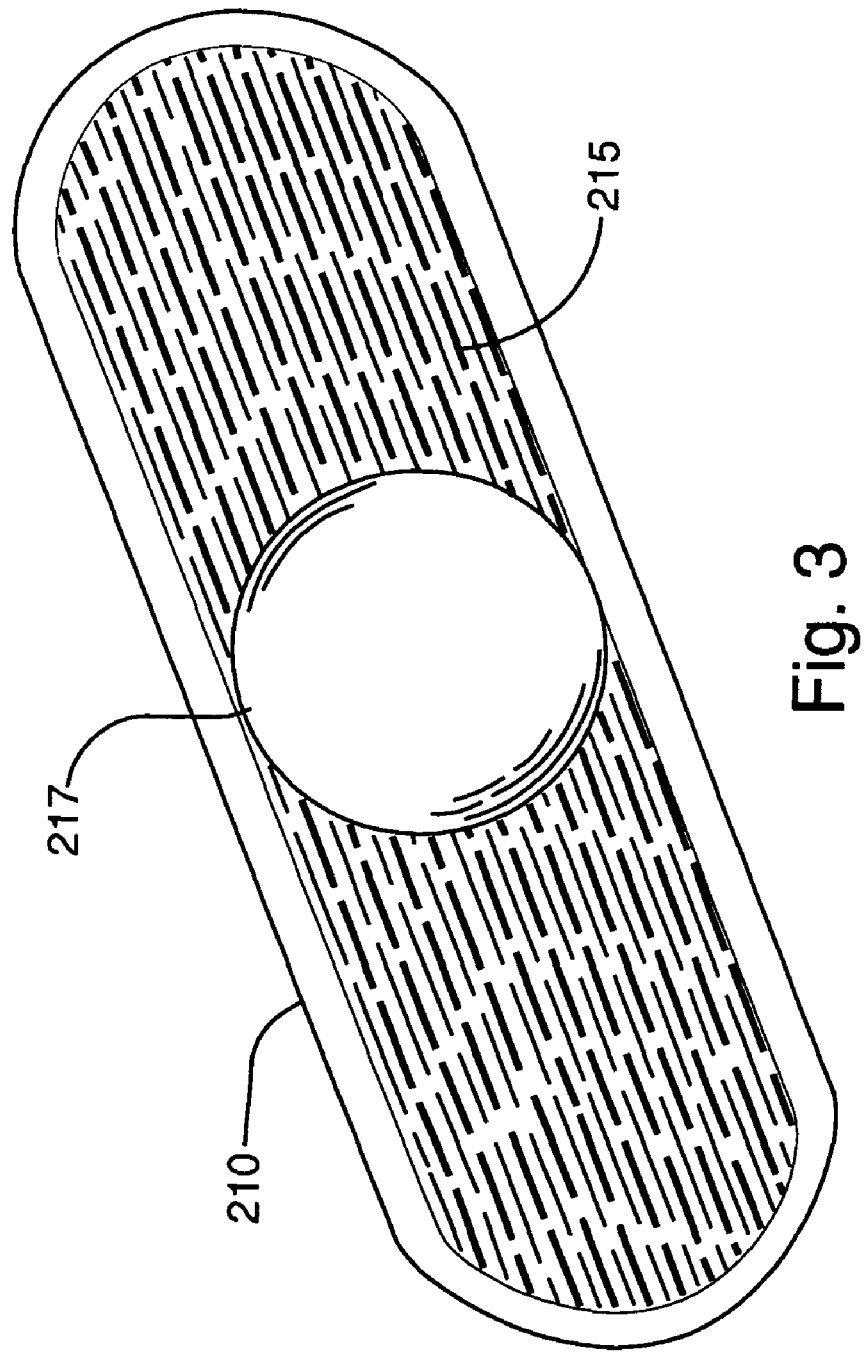
FIG. 3 is an isometric view of a capsule containing liquid and an inertial mass.

FIG. 3 provides an isometric view of capsule 210. Capsule 210 is positioned within panel 110 at a specific depth that is a function of the stiffness of the foam, the mass of capsule 210, and the frequency of the target structural resonance that is to be attenuated by capsule 210. Panel 110 will provide some effective stiffness that is a function of the material properties of the foam and the thickness of panel 110 lying between fairing wall 120 and capsule 210. The mass of capsule 210 and the stiffness of panel 110 will create a resonant frequency at which capsule 210 will vibrate within (and relative to) panel 110. The resonance of the capsule 210 is designed to interrupt and attenuate the structural vibration of the walls of fairing 120, as will be subsequently explained. This approach allows panel 110 to act on low frequency structural dynamics.

Figure 4:
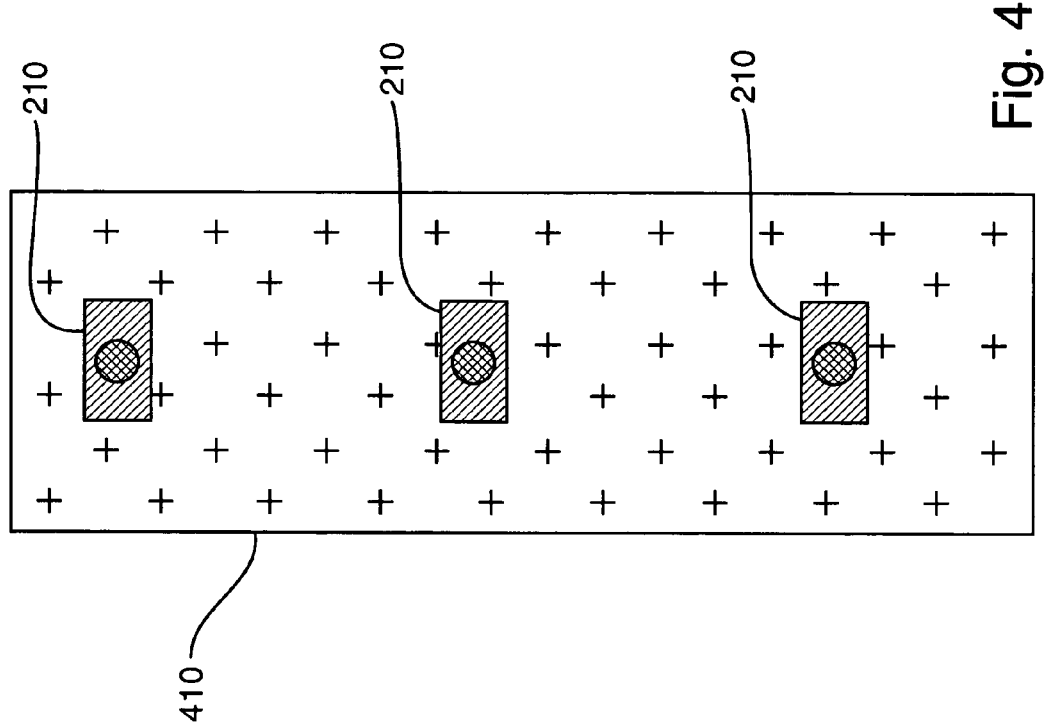
FIG. 4 is a cross sectional view of a single foam panel with multiple embedded capsules, each containing liquid and an inertial mass.

Targeting low frequency structural resonances can be achieved using a single capsule 210 in each panel 110, as shown in FIG. 2, or using multiple capsules 210 in each panel 410, as shown in FIG. 4. Using multiple capsules 210 in each panel 410 produces multiple resonance frequencies. The dominant resonance frequency is produced by the combined mass of capsules 210. Other resonances may be respectively determined from the properties of panel 410 and combinations of capsules 210 successively comprised of one capsule 210, then two, up to the total number of capsules 210 minus one.

Different panels can be designed to target different structural resonances where it is desired to attenuate multiple structural resonances. FIG. 5 shows panels 510 and 520, each designed for different resonant frequencies. This is accomplished by placing capsules 210 at different depths in panels 510 and 520, respectively. Alternatively, the mass of capsules 210 can be varied to change the resonant frequencies. Panels 510 and 520 are respectively attached to interior fairing walls 522 and 524.

Figure 6:
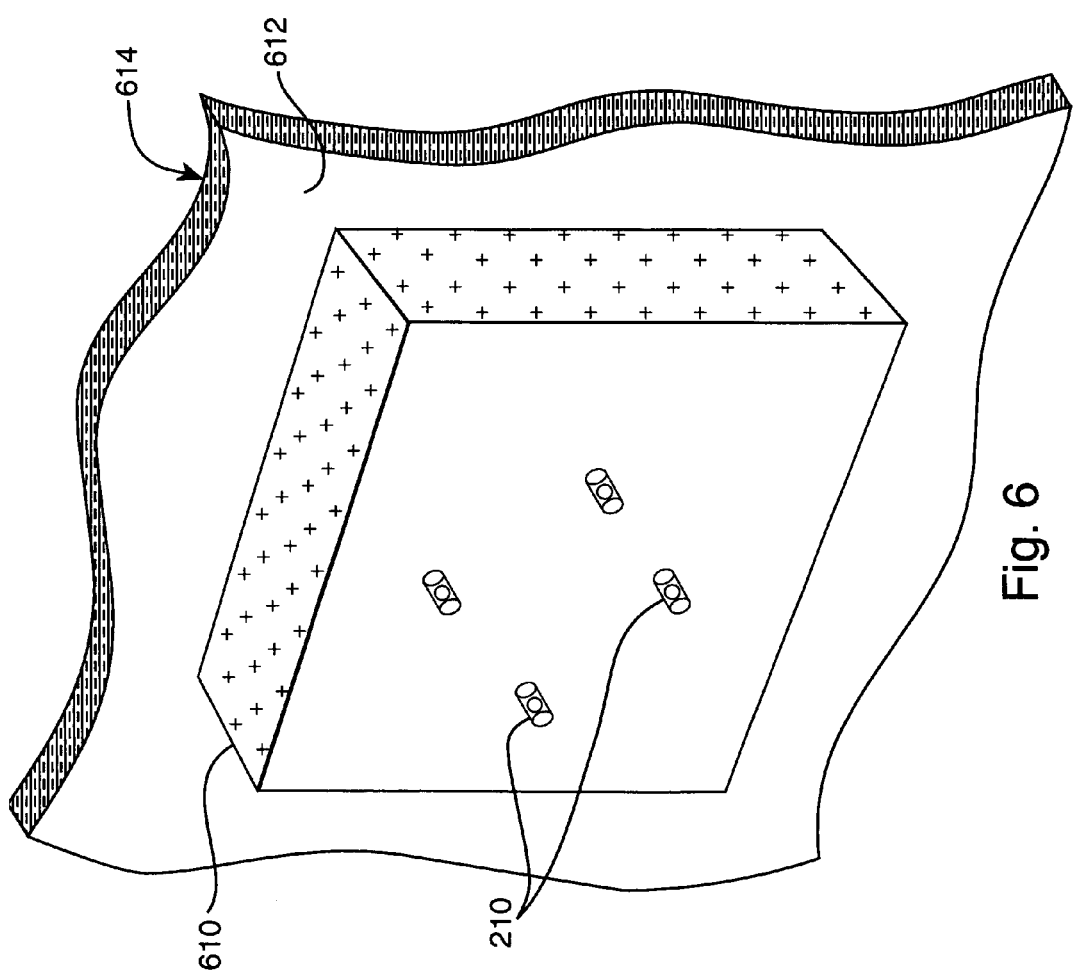
FIG. 6 is an isometric view of a foam panel containing multiple capsules, attached to a fairing wall.

FIG. 6 illustrates an isometric view of foam panel 610 having multiple capsules 210 embedded therein. Panel 610 is attached to the interior surface 612 of fairing wall 614. In actual application, capsules 210 would not be visible, since they would be embedded within panel 610. Capsules 210 are positioned within panel 610 to maximize spatial coupling to the target structural resonances.

Figure 7:
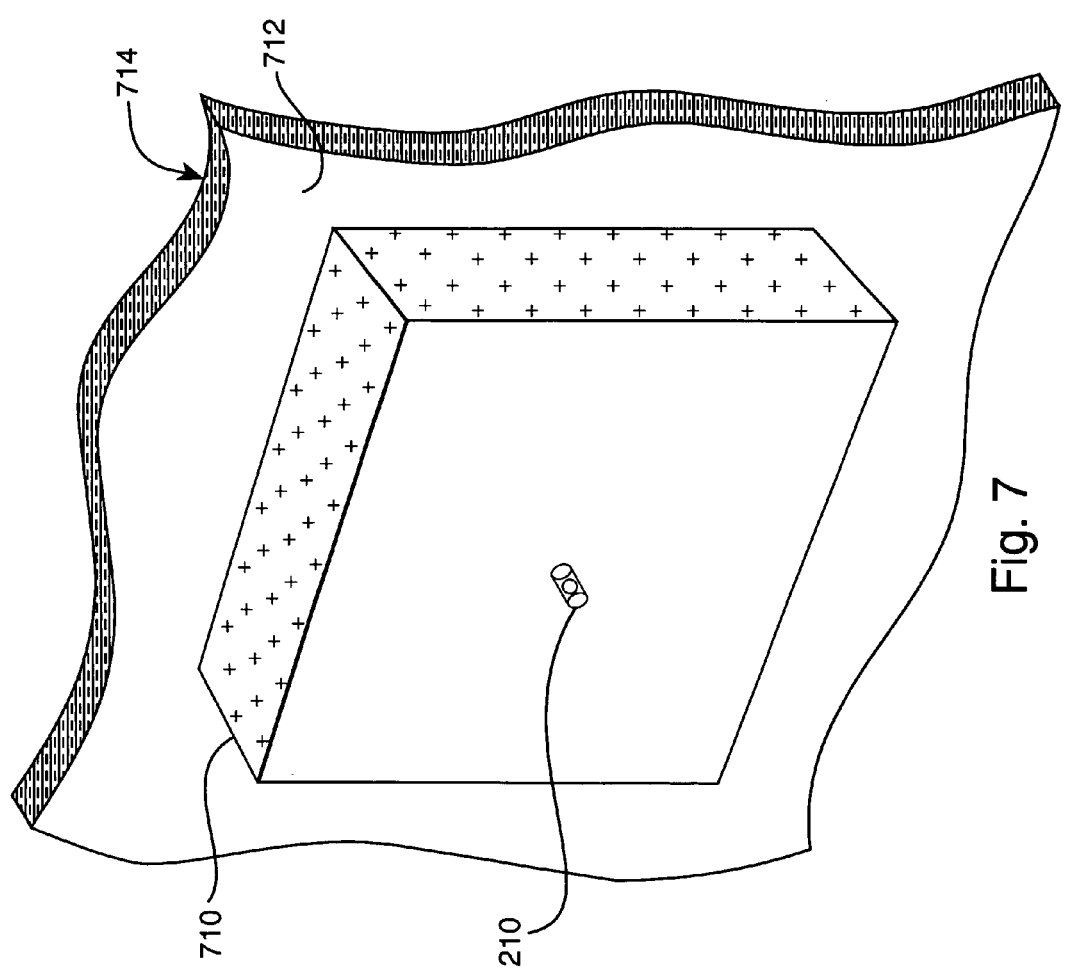
FIG. 7 is an isometric view of a panel containing a single capsule device, attached to a fairing wall.

FIG. 7 is an isometric view of foam panel 710 having a single embedded capsule 210. Foam panel 710 is attached to interior surface 712 of fairing wall 714. It is to be understood that the panels of the present invention are not necessarily rectangular, but may have other geometries. When external acoustic loads impinge on the external surfaces of fairing wall 714, the wall will vibrate. This vibration will cause capsule 210 to vibrate. The entire system will behave like a spring-mass-damper system, where the portion of foam panel 710 lying between interior surface 712 and capsule 210 acts as a spring.

Figure 8:
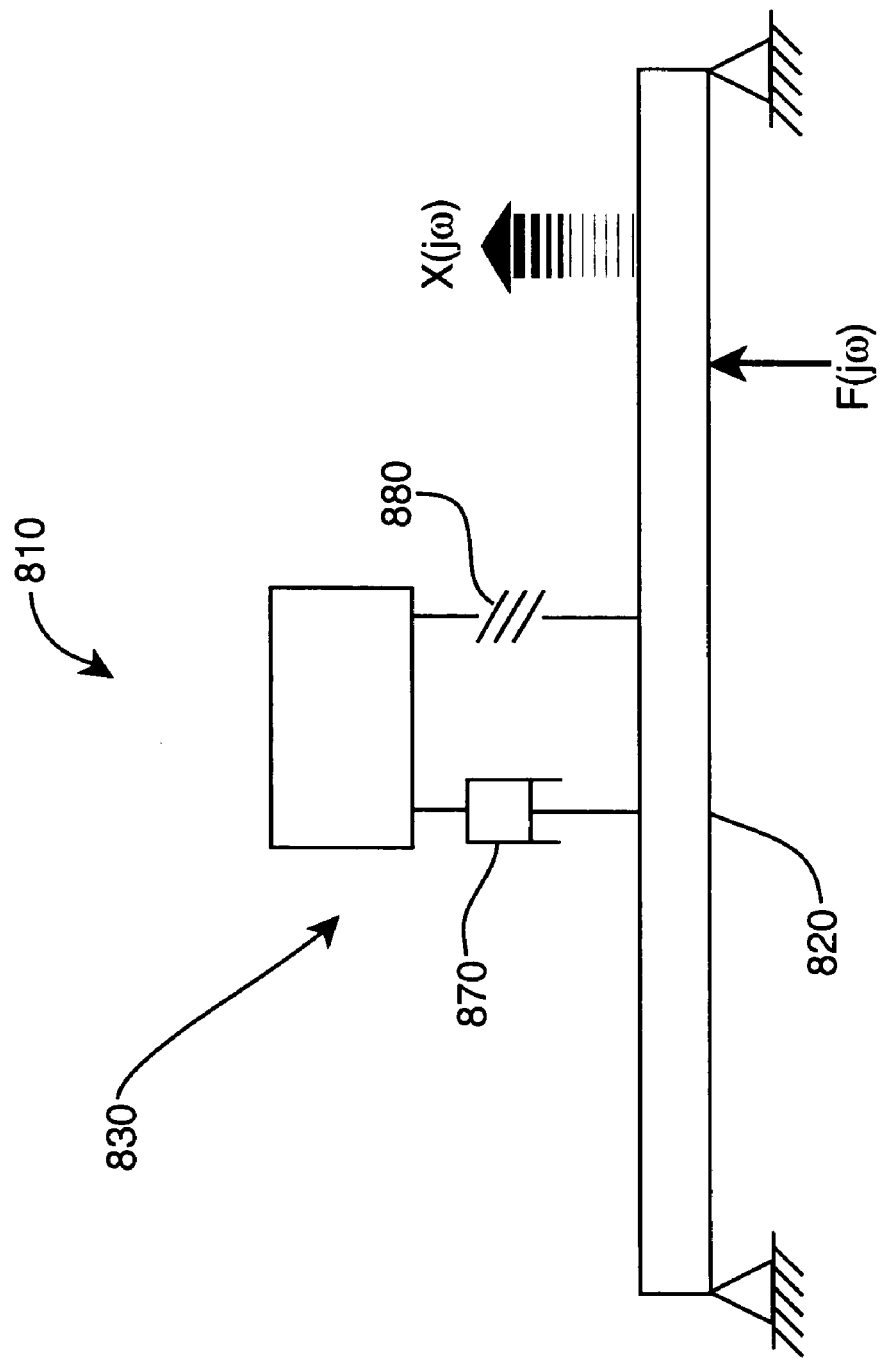
FIG. 8 is a schematic drawing of simple one-dimensional model used to approximate the dynamic behavior of a fairing wall having an attached foam panel, where the panel has an embedded rigid, solid mass.

As an example, consider the simple, one-dimensional system 810 schematically shown in FIG. 8. A fairing wall is modeled as simply supported beam 820, which has some mass, stiffness, and damping. Damping of launch vehicle fairings is generally light, so for this example one can assume a damping ratio of 0.1%. Attached to the beam 820 is a spring-mass-damper system 830 that represents a rigid, solid mass embedded in a foam panel, such as panel 710 (without embedded capsule 210). Spring-mass-damper system 830 includes dashpot 870 in parallel with spring 880. The structural damping of the foam panel is modeled by the dashpot 870, and is reasonably assumed slight at 0.5%, and the embedded mass is normalized to the mass of the fairing wall, i.e., beam 820, such that the ratio of the embedded mass to the panel mass is 1%. The stiffness provided by beam 820 is defined such that the resonance of the spring-mass-damper system 830 is proximal to the resonance of beam 820, which is a simplifying assumption for this analysis. A disturbance input is shown as $F(j\omega)$, and the panel's out-of-plane motion is denoted by $X(j\omega)$.

Figure 9:
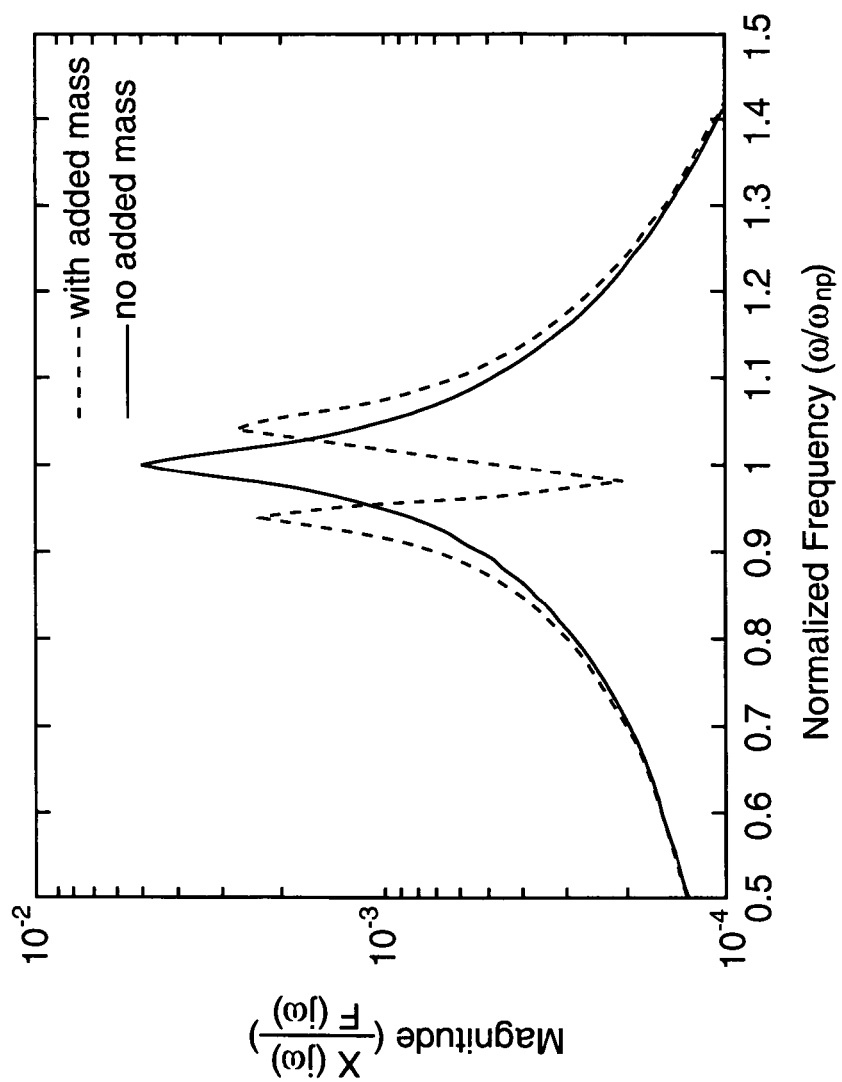
FIG. 9 is a plot of the frequency responses for fairing wall models for simulations performed with and without an attached foam panel having an embedded rigid, solid mass.

The frequency responses of beam 820 with and without an embedded mass represented by spring-mass-damper system 830 are shown by the overlaid graphs in FIG. 9. The frequency response between an external disturbance input and the out-of-plane displacement of a foam panel, such as panel 710, is shown on the ordinate as $X(j\omega)/F(j\omega)$). The frequency has been normalized by the panel resonant frequency, and is shown on the abscissa as $\omega_{np}$. A comparison of the graphs shows that the on-resonance response is reduced by the spring-mass-damper system 830, but that two lightly damped peaks are present at different frequencies. Two sharp peaks occur because the damping was assumed to be slight, 0.5%, a reasonable approximation for acoustic foam, which is lightweight and thus has little structural damping. Since there is little overall reduction across the bandwidth, it is clear that this approach provides little to no reduction of the transmitted noise.

Figure 10:
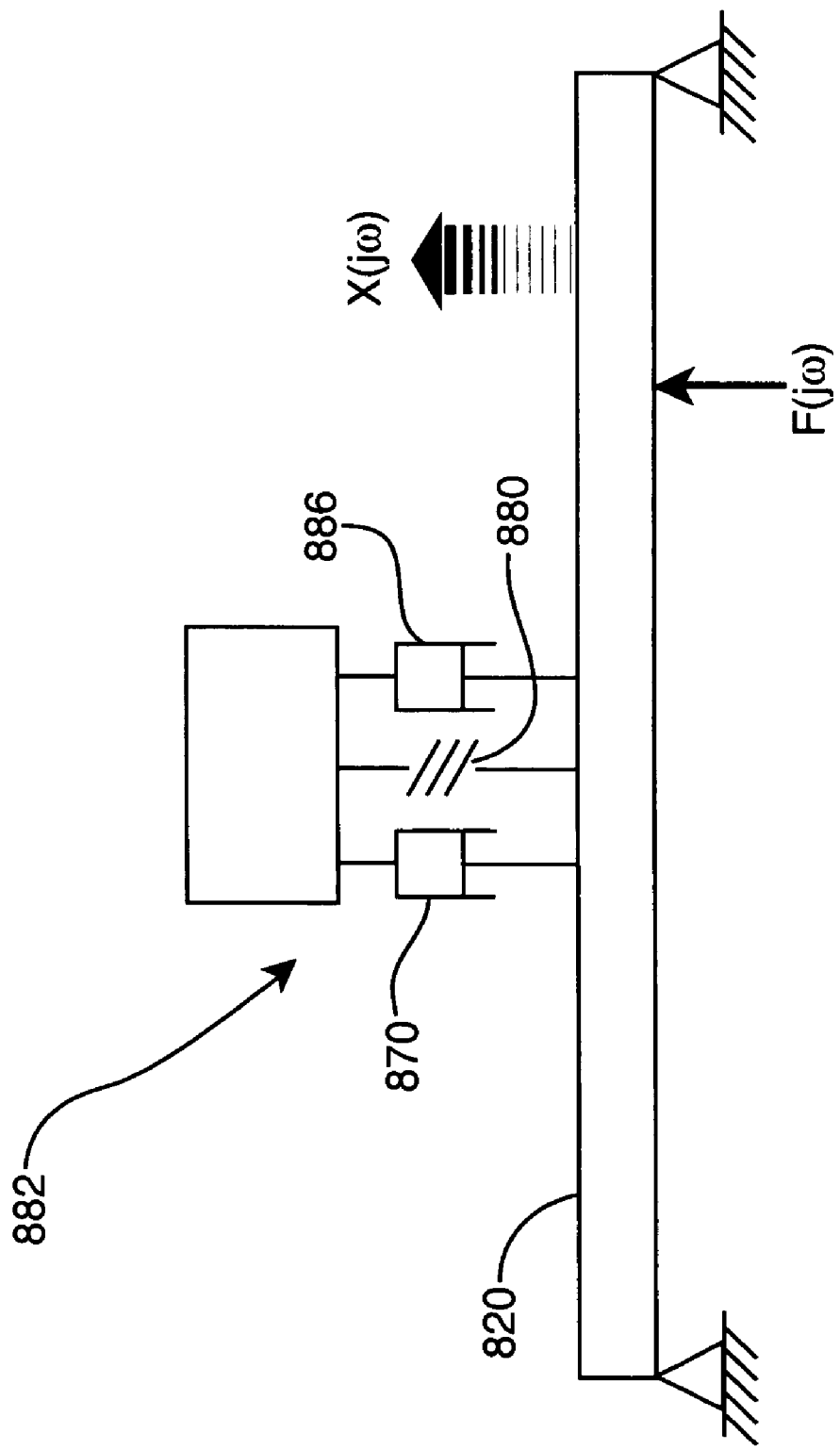
FIG. 10 is a schematic drawing of simple, one-dimensional model used to approximate the dynamic behavior of a fairing wall with an attached foam panel having an embedded fluid-filled capsule of the present invention.
Figure 11:
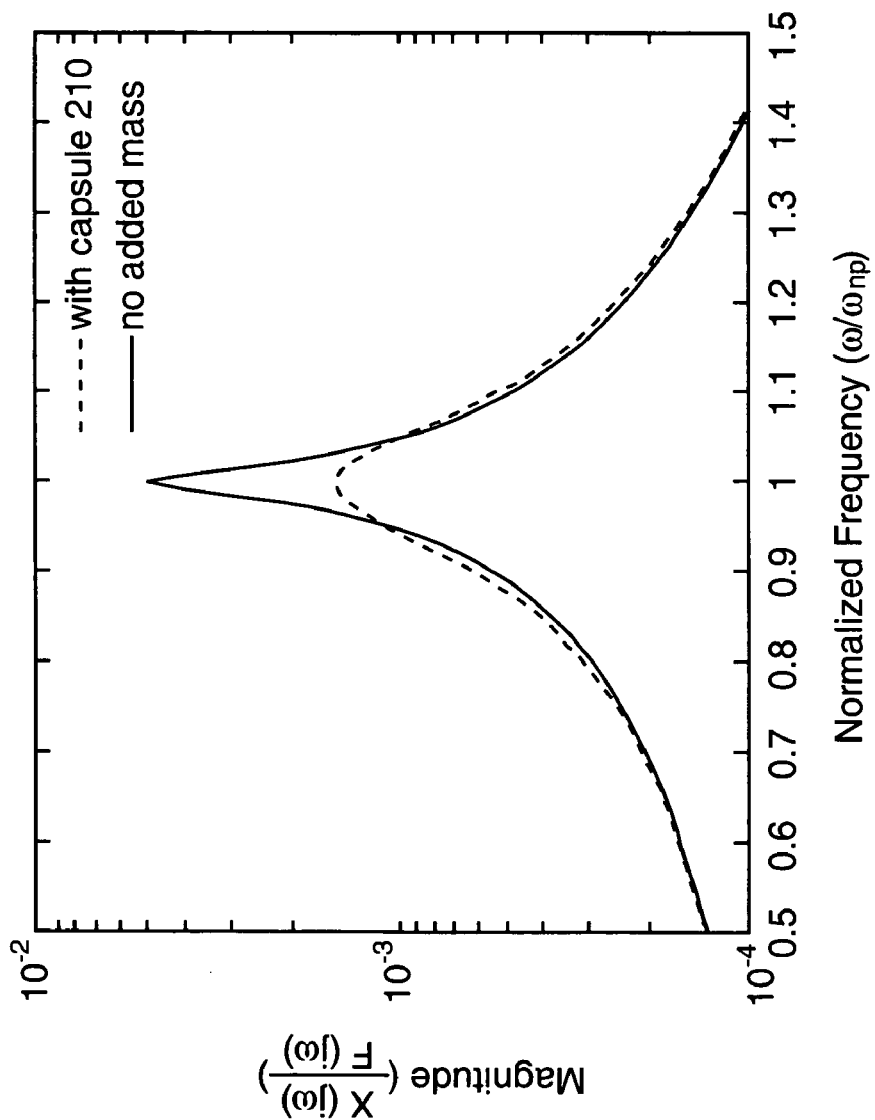
FIG. 11 is a plot of the frequency response functions for fairing wall models for simulations performed with and without an attached foam panel having an embedded capsule of the present invention.

FIG. 10 is a schematic drawing of spring-mass-damper system 882, which is a modification of spring-mass-damper system 830 obtained by adding dashpot 886 in parallel with dashpot 870 and spring 880. Dashpot 886 models the interaction between inertial mass 217 and fluid 215 of capsule 210. System 882 thus models the effect of embedding capsule 210 in foam panel 710. A ball bearing will behave like an inertial "reference" mass, and fluid 215 provides additional damping, very similar to the so-called "skyhook damper," which is described in S. Griffin, J. Gussy, S. Lane, B. Henderson, and D. Sciulli, "Virtual Skyhook Vibration Isolation. System," *Journal of Vibration and Acoustics*, Vol. 124, No. 1, pp. 63-67 (ASME, January 2002). This modification augments the inherent damping of foam panel 710 and, as shown in the graph of FIG. 11, the amplitude of vibration of beam 820 is reduced, which will result in a significant decrease of acoustic transmission. Targeting specific structural resonances that are efficient acoustic radiators is the second important feature of this invention, and offers a distinct advantage from prior sound barriers and blankets. Since capsule 210 occupies a very small volume and has a negligible mass relative to the volume and mass of the foam panel in which it is embedded, its presence does not adversely affect the performance of the panel. Combining optimal structural vibration attenuation with the inherent acoustic dissipation of foam panel 710 thus enhances the noise reduction afforded by the foam panel, with a negligible weight penalty.

Figure 12:
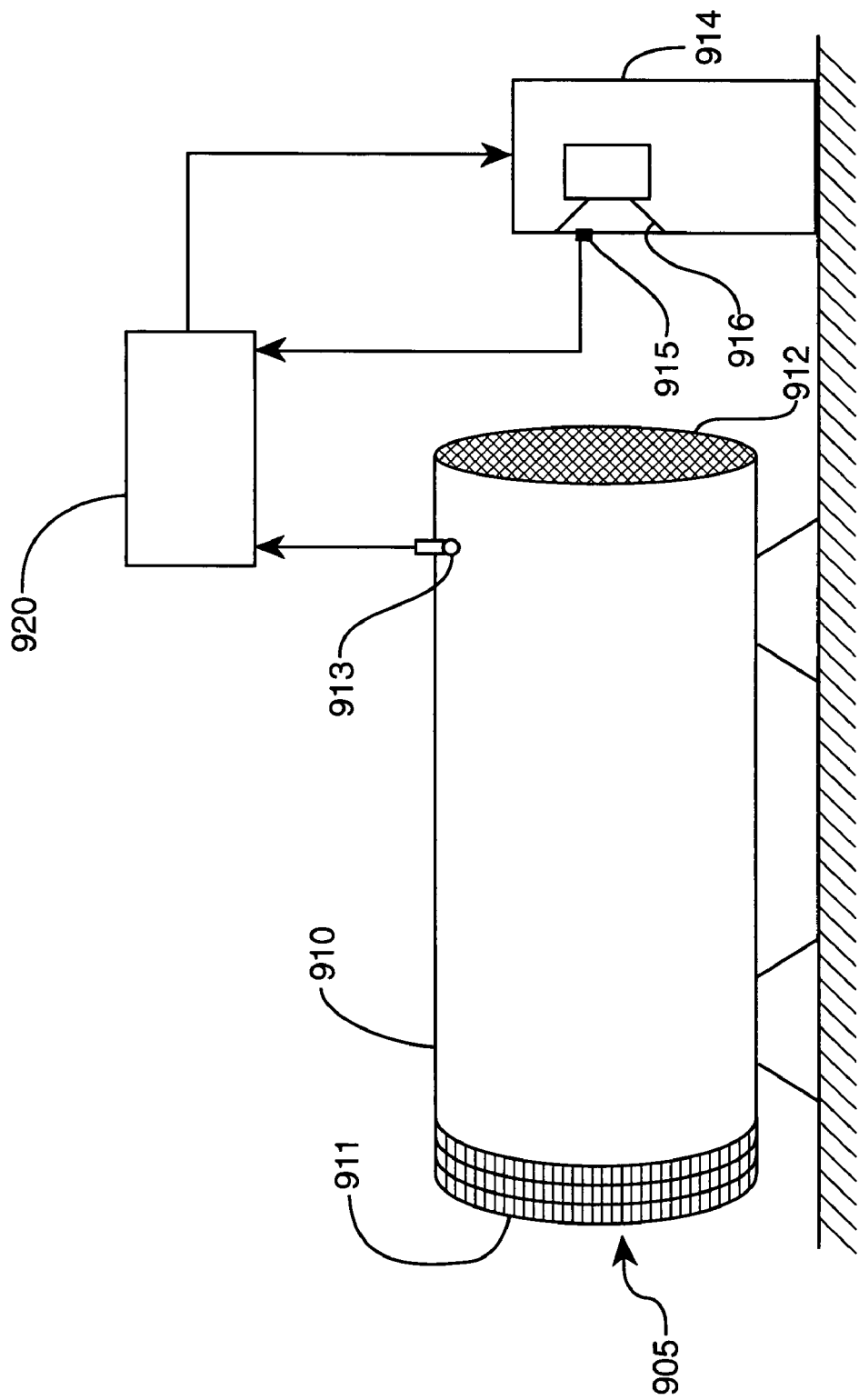
FIG. 12 is a schematic drawing of the laboratory setup used to test the invention's performance.

The present invention was tested and demonstrated in an experiment using the setup shown in FIG. 12. Acoustic cavity 905 was enclosed by hollow aluminum cylinder 910. Cylinder 910 was made from ¼-inch aluminum, was 80 inches in length, and had an inside diameter of 24 inches. Cap 911 was formed using medium density particleboard having a thickness of 3 inches. Panel 912 capped the other end of cylinder 910, and was formed from ⅛-inch thick aluminum. Panel 912 simulated the lightly-damped resonant behavior of a launch vehicle fairing, and had a fundamental resonance at about 130 Hz. Cavity 905 had its first acoustic resonance at 80 Hz, and it second resonance at 160 Hz. Microphone 913 was placed inside cavity 905 to measure the before and after acoustic response. Loudspeaker 914 was placed outside cavity 905 to provide an acoustic disturbance source. Accelerometer 915 was attached to diaphragm 916 of loudspeaker 914 to provide a reference of the disturbance. Spectrum analyzer 920 generated the disturbance signal, measured the reference signal, measured the microphone signal, and computed frequency responses.

In the first test case, a small block of foam with a small metal ball bearing was attached by spray adhesive to aluminum panel 912. A small block was used because it was desired to isolate and compare the effect of the ball bearing with that of capsule 210 of the present invention, and a large foam block would have mass-loaded panel 912 and obscured the results of the experiment. In the second test case, the same foam block was used but, instead of the metal ball bearing of the first test case, capsule 210 having a mass equal to that of the metal ball bearing of the first test case was embedded in the foam block and the foam block was attached to panel 912.

Figure 13:
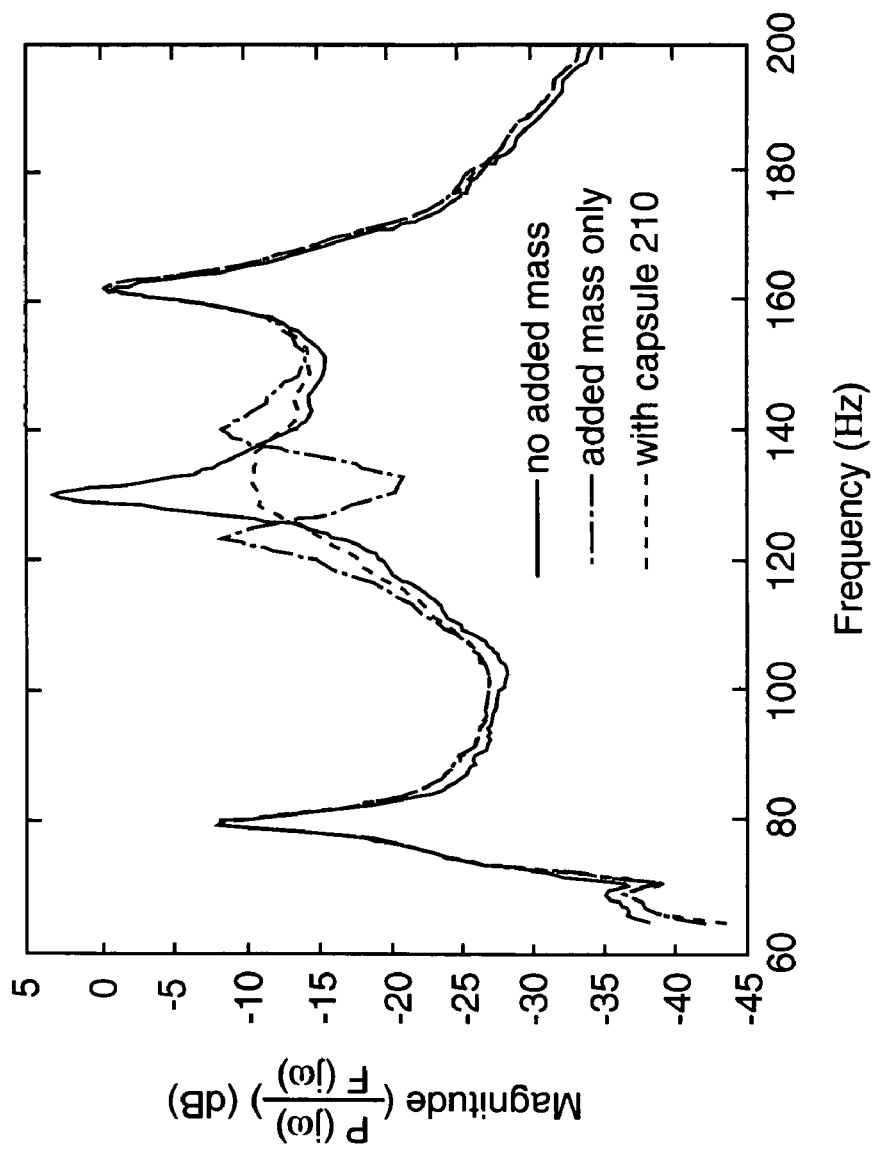
FIG. 13 is a plot of the frequency responses in an acoustic cavity measured during laboratory tests to evaluate the effectiveness of the capsule of the present invention, performed using the laboratory setup schematically illustrated in FIG. 12.

The experimental results are shown in the graph illustrated in FIG. 13, which shows the measured frequency responses between the disturbance input, denoted as $F(j\omega)$, and the microphone measurement, denoted as $P(j\omega)$. The frequency response functions show peaks at the first two acoustic resonances at 80 Hz and 160 Hz, and at the structural resonance at 130 Hz. The first test case ("added mass only") split the structural resonance as predicted in FIG. 9. The second test case ("with capsule 210") used capsule 210 of the present invention, and behaved as predicted by FIG. 11. More particularly, panel 912 having embedded capsule 210 attached thereto was able to optimally couple with and attenuate the structural resonance, which significantly reduced the measured acoustic response over the 120 Hz to 150 Hz bandwidth. This is a relatively broadband reduction for a single structural device. The response was reduced by approximately 12 dB. The presence of capsule 210 had no adverse effect, i.e., spillover, on the noise transmission at other frequencies, which is often a problem with structural devices and active noise control approaches It is to be understood that the preceding is merely a detailed description of several embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. An acoustic barrier for attenuating transmission of vibro-acoustic energy comprising:
    A panel composed of a foam;
    A sealed capsule embedded in the panel;
    The capsule being tubular,
    Having two ends, a linear axial centerline intersecting the two ends, and a transverse cross-section that is symmetrical about the axial centerline, and containing a fluid and a discrete mass for translating through the capsule;
    a volume being enclosed by an interior surface of a wall; and
    the panel for being attached to a portion of the interior surface to restrict relative motion between the panel and the wall, whereby
    the panel attenuates transmission of vibro-acoustic energy into the volume.

2. An acoustic barrier as defined in claim 1 wherein: each of the ends has a radius of curvature having a center; and both of the radii of curvature line on the axial centerline.

3. An acoustic barrier as defined in claim 1 wherein the capsule is filled with the fluid.

4. An acoustic barrier as defined in claim 3 wherein the fluid is a liquid.

5. An acoustic barrier as defined in claim 4 further comprising a plurality of the capsules embedded in the foam panel.

6. An acoustic barrier as defined in claim 4 wherein:
    The capsule has a minimum inner width and a length; and the discrete mass has a shape having a maximum cross-section less than the minimum inner width, whereby The discrete mass translates through out the length of the capsule.

7. An acoustic barrier as defined in claim 6 wherein: the capsule has a uniform circular transverse cross-section, and the discrete mass has a spherical shape; the minimum inner width is an inner diameter; and the spherical shape has a diameter less than the inner diameter.

8. An acoustic barrier as defined in claim 7 further comprising a plurality of the capsules embedded in the foam panel.

9. An acoustic barrier as defined in claim 7 wherein the discrete mass is a ball bearing.

10. An acoustic barrier as defined in claim 1 wherein:
The capsule is cylindrical; the ends are planar and lie normal to the axial centerline; and the discrete mass is a sphere.

11. An acoustic barrier as defined in claim 1 wherein the foam for providing broadband dissipation of vibro-acoustic energy is in the volume.

12. An acoustic barrier as defined in claim 11 wherein the capsule is for attenuating a structural resonance of the wall.

13. An acoustic barrier as defined in claim 1 wherein the wall is a fairing of a flight vehicle.

14. An acoustic barrier for attenuating transmission of vibro-acoustic energy comprising:
A panel composed of a foam;
A capsule being tubular, having two ends, a linear axial centerline intersecting the two ends, and a transverse cross section that is symmetrical about the axial centerline, and containing a fluid and a discrete mass for translating through the capsule; a plurality of the capsules being embedded in the panel and the capsules being respectively positioned in the panel to attenuate a plurality of structural resonances of the wall.

15. An acoustic barrier as defined in claim 14 wherein: the capsule has a length and a uniform circular transverse cross-section, and the discrete mass has a spherical shape; the circular transverse cross-section has an inner diameter; and the spherical shape has a diameter less than the inner diameter, whereby the discrete mass translates throughout the length of the capsule.

16. An acoustic barrier as defined in claim 15 wherein the fluid is a liquid.

17. An acoustic barrier as defined in claim 16 wherein the discrete mass is a ball bearing.

18. An acoustic barrier as defined in claim 14 wherein: the capsule is cylindrical; the ends are planar and lie normal to the axial centerline; and the discrete mass is a sphere.

19. An acoustic barrier as defined in claim 13 wherein a plurality of the panels are attached to the interior surface of the fairing.

* * * * *